United States Patent
Chen et al.

(10) Patent No.: US 9,911,094 B1
(45) Date of Patent: Mar. 6, 2018

(54) INTELLIGENT KEY PERFORMANCE INDICATOR CATALOG

(71) Applicant: International Business Machines Corporation, Armonk, NY (US)

(72) Inventors: Jane Chen, Melbourne (AU); Allan F. Bautista, Sunshine (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/705,729

(22) Filed: Sep. 15, 2017

Related U.S. Application Data

(63) Continuation of application No. 15/592,453, filed on May 11, 2017.

(51) Int. Cl.
| | |
|---|---|
| *G06F 17/00* | (2006.01) |
| *G06Q 10/06* | (2012.01) |
| *G06F 17/30* | (2006.01) |
| *G06F 3/0481* | (2013.01) |
| *G06F 3/0482* | (2013.01) |

(52) U.S. Cl.
CPC . *G06Q 10/06393* (2013.01); *G06F 17/30554* (2013.01); *G06F 3/0482* (2013.01); *G06F 3/04817* (2013.01)

(58) Field of Classification Search
CPC ......... G06F 17/30554; G06F 17/30572; G06F 17/30991
See application file for complete search history.

(56) References Cited

U.S. PATENT DOCUMENTS

| | | | | |
|---|---|---|---|---|
| 7,716,592 | B2 * | 5/2010 | Tien | G06Q 40/00 715/744 |
| 7,848,947 | B1 * | 12/2010 | McGloin | G06Q 10/06398 705/2 |
| 9,058,307 | B2 * | 6/2015 | Tien | G06F 17/21 |
| 9,596,146 | B2 * | 3/2017 | Coates | G06F 17/30572 |
| 9,639,898 | B2 * | 5/2017 | Finley | G06Q 40/10 |
| 2008/0172629 | A1 * | 7/2008 | Tien | G06Q 10/10 715/771 |
| 2008/0282175 | A1 * | 11/2008 | Costin | G06F 8/38 715/760 |
| 2009/0187845 | A1 * | 7/2009 | Middelfart | G06F 17/30554 715/772 |

(Continued)

FOREIGN PATENT DOCUMENTS

WO      2016164667 A1     10/2016

OTHER PUBLICATIONS

Unknown, "Cool Business Mashups in Minutes", Software AG, Aris MashZone, Copyright 2010 Software AG, 2 pages.

(Continued)

*Primary Examiner* — Laurie Ries
(74) *Attorney, Agent, or Firm* — Laura E. Gisler

(57) ABSTRACT

A system may generate and update a key performance indicator (KPI) on a KPI dash. The system may receive a request and access KPI data to generate a self-contained KPI object. The system can also use metadata associated with the KPI to generate a set of metadata objects to be included in the KPI object. The self-contained KPI object can be displayed on the dashboard, and responsive to a rating received from a user, a cumulative rating may be updated. The new rating may be displayed within the KPI on the dashboard.

1 Claim, 8 Drawing Sheets

(56) References Cited

U.S. PATENT DOCUMENTS

| | | | | |
|---|---|---|---|---|
| 2010/0070448 A1* | 3/2010 | Omoigui | ............ | H01L 27/1463 706/47 |
| 2011/0071886 A1* | 3/2011 | Schnur | ................ | G06Q 10/04 705/7.38 |
| 2011/0131082 A1* | 6/2011 | Manser | ................ | G06Q 10/06 705/7.42 |
| 2011/0214081 A1* | 9/2011 | Dobrin | ............ | G06Q 10/06395 715/771 |
| 2011/0252321 A1* | 10/2011 | Handy | ................ | G06F 3/048 715/709 |
| 2012/0259752 A1* | 10/2012 | Agee | .................. | G06Q 40/00 705/35 |
| 2013/0132108 A1* | 5/2013 | Solilov | ................ | G06Q 10/06 705/2 |
| 2013/0187926 A1* | 7/2013 | Silverstein | .......... | G06Q 10/105 345/440 |
| 2014/0282053 A1* | 9/2014 | Hauschild | ............ | G06F 9/4443 715/744 |
| 2014/0344024 A1* | 11/2014 | Kempf | ............ | G06Q 10/06393 705/7.39 |
| 2014/0379388 A1* | 12/2014 | Lundberg | ......... | G06F 17/30864 705/4 |
| 2015/0348066 A1* | 12/2015 | Sewak | .............. | G06Q 30/0202 705/7.31 |
| 2016/0092602 A1* | 3/2016 | Liu | ................... | G06F 17/30398 715/738 |
| 2016/0103907 A1* | 4/2016 | Bingham | ......... | G06F 17/30572 707/722 |
| 2016/0105329 A1* | 4/2016 | Coates | ............ | G06F 17/30572 715/736 |
| 2016/0110670 A1* | 4/2016 | Chatterjee | ........ | G06Q 10/06393 705/7.39 |
| 2016/0155200 A1* | 6/2016 | Basu | ...................... | G06Q 40/06 705/36 R |
| 2016/0224920 A1* | 8/2016 | Doms | ............. | G06Q 10/06393 |
| 2016/0232140 A1* | 8/2016 | Ciloci | ................... | G06Q 10/10 |
| 2017/0195195 A1* | 7/2017 | Fletcher | ................ | H04L 43/045 |

OTHER PUBLICATIONS

Mell et al., "The NIST Definition of Cloud Computing", Recommendations of the National Institute of Standards and Technology, NIST Special Publication 800-145, Sep. 2011, 7 pages.

List of IBM Patents or Patent Applications Treated as Related, dated Sep. 15, 2017, pp. 1-2.

Chen et al., "Intelligent Key Performance Indicator Catalog", U.S. Appl. No. 15/592,453, filed May 11, 2017.

* cited by examiner

| Intelligent KPI name | Description | Business Rules | Unit | Frequency | Domain | Summary / Detail | Parent / Child KPI | Chart Type | Visual Example(s) | Usage | Rating | Source/ Input |
|---|---|---|---|---|---|---|---|---|---|---|---|---|
| Total exposure hours | The number of hours personnel are exposed to environment | • Parameters (season, time, location etc) • Algorithm for deriving KPI | Hours | Monthly | Health & Safety | Summary chart | Parent | Area graph | | • No. of users • Context • Dashboard • Peer KPIs • Insight sought | 5 stars | (Application name) |
| | | | | | | | | Donut pie graph | | | | |
| Recordable injuries vs exposure hours | The number of recordable injuries measured against hours exposed to work environment. | • Parameters (eg. Time, Date, Recorded injury, season, location etc) • Algorithm for deriving KPI | Hours | Daily | Health & Safety | Mid level chart | Child | Bar chart | | • No. of users • Context • Dashboard • Peer KPIs • Insight sought | 3 stars | (Application Name) |

FIG. 5

INTELLIGENT KEY PERFORMANCE INDICATOR CATALOG

BACKGROUND

The present disclosure relates to computer systems, and more specifically, to generating intelligent key performance indicators.

Computer systems may access data and generate new data models, for example, charts, graphs, or other visual displays of data, to facilitate the generation of new data insights by a user or users. Users may share this data and store it for later use. Key performance indicators (KPIs) may be a type of performance measurement that can evaluate the success of an organization or of a particular activity in which the organization participates. KPIs can be displayed on a dashboard or created by a user. KPIs may define a set of values against which to measure, including quantitative indicators, qualitative indicators, leading and lagging indicators, process indicators, and several others.

SUMMARY

Embodiments of the present disclosure may be directed toward a method which includes receiving a request for a first key performance indicator (KPI). The system may access from a data source, KPI data associated with the first KPI. The system may generate a self-contained KPI by accessing KPI template code and visualization template code from a set of code libraries and using the code, generate a self-contained KPI object. A set of KPI metadata associated with the first KPI can also be accessed from a KPI catalog and used to generate a set of KPI metadata objects. The KPI metadata objects can be displayed on the KPI dashboard as part of the self-contained KPI. A rating object may be a part of the KPI metadata objects. In response to receiving a rating for the first KPI from a user, the system may update a cumulative rating for the first KPI. The cumulative rating may be stored in the KPI catalog and the cumulative rating may indicate a usefulness of the first KPI to a user. The system may then display the updated cumulative rating within the self-contained KPI object and on the KPI dashboard.

Embodiments of the present disclosure may be directed toward a computer system with a computer readable storage medium with program instructions stored thereon and at least one processor configured to execute those program instructions to perform a method. The method may include receiving a request for a first KPI. The system may access from a data source, KPI data associated with the first KPI. The system may generate a self-contained KPI by accessing KPI template code and visualization template code from a set of code libraries and using the code, generate a self-contained KPI object. A set of KPI metadata associated with the first KPI can also be accessed from a KPI catalog and used to generate a set of KPI metadata objects. The KPI metadata objects can be displayed on the KPI dashboard as part of the self-contained KPI. A rating object may be a part of the KPI metadata objects. In response to receiving a rating for the first KPI from a user, the system may update a cumulative rating for the first KPI. The cumulative rating may be stored in the KPI catalog and the cumulative rating may indicate a usefulness of the first KPI to a user. The system may then display the updated cumulative rating within the self-contained KPI object and on the KPI dashboard.

Embodiments of the present disclosure may be directed toward a computer program product with a computer readable storage medium with program instructions embodied therewith. The computer readable storage medium is not be a signal per se. The program instructions may be executable by a computer processor to cause the processor to perform a method. The method may include receiving a request for a first KPI. The system may access from a data source, KPI data associated with the first KPI. The system may generate a self-contained KPI by accessing KPI template code and visualization template code from a set of code libraries and using the code, generate a self-contained KPI object. A set of KPI metadata associated with the first KPI can also be accessed from a KPI catalog and used to generate a set of KPI metadata objects. The KPI metadata objects can be displayed on the KPI dashboard as part of the self-contained KPI. A rating object may be a part of the KPI metadata objects. In response to receiving a rating for the first KPI from a user, the system may update a cumulative rating for the first KPI. The cumulative rating may be stored in the KPI catalog and the cumulative rating may indicate a usefulness of the first KPI to a user. The system may then display the updated cumulative rating within the self-contained KPI object and on the KPI dashboard.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 depicts an example list of two self-contained KPI objects, according to embodiments.

Figure 1:
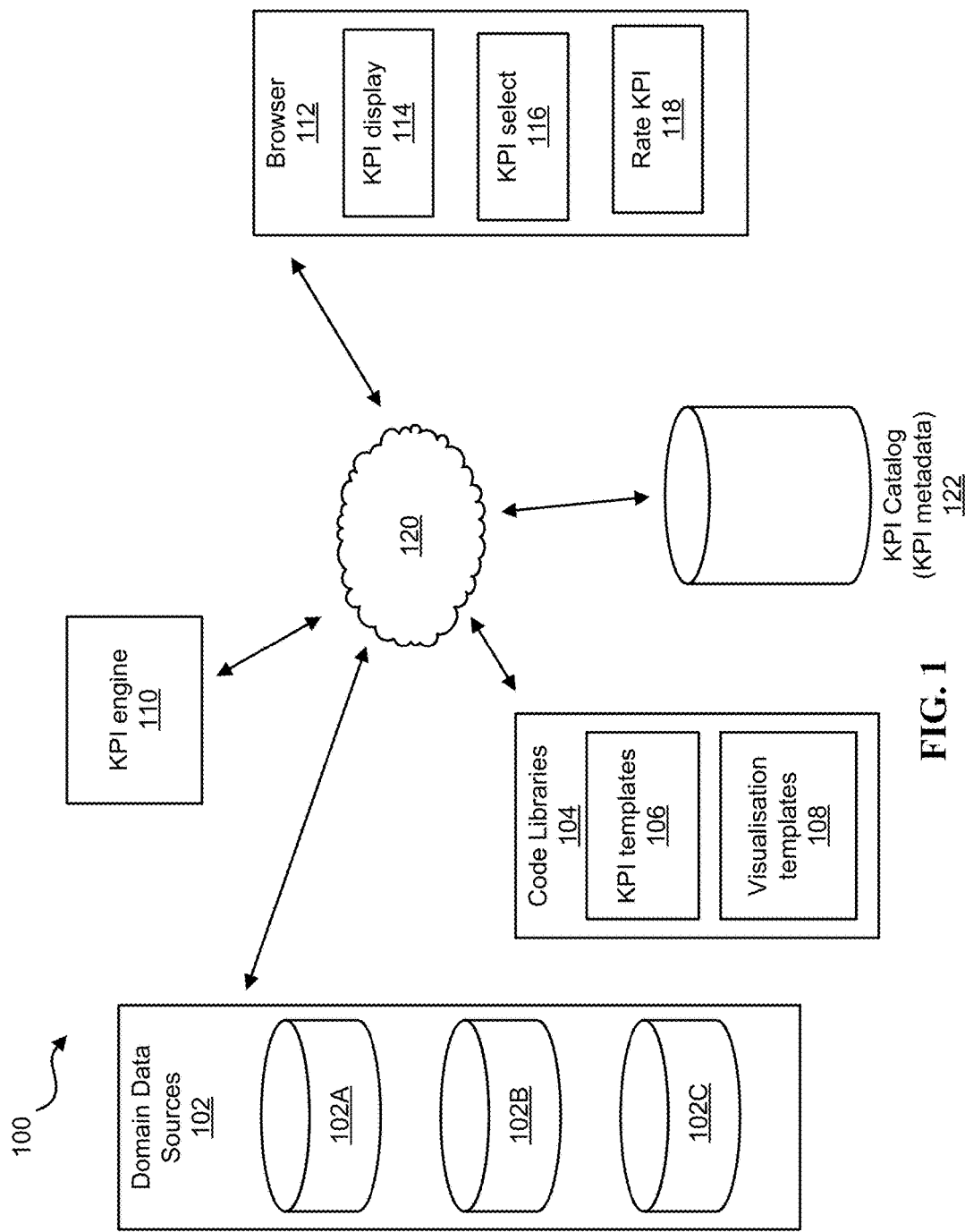
FIG. 1 depicts a block diagram of a system for generating an intelligent KPI object, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer systems, more particular aspects relate to real-time data analytics generation. While the present disclosure is not necessarily limited to such applications, various aspects of the disclosure may be appreciated through a discussion of various examples using this context.

In embodiments, analytics solutions may present data to business or client users on dashboards. Data analytics may be presented in a particular format known as key performance indicators or "KPIs". As implied by the name, this format displays various indicators that are deemed by a user or client as important to predicting or reflective of business performance. In many cases, KPIs may be presented on a pre-configured dashboard. For example, a user may, on a limited basis, be able to select the metrics they wish to see on the dash from a predefined list of KPIs. In these cases, the user may be unable to select a specific KPI or set of KPIs if the desired KPI(s) is/are not a part of the pre-configured list. Thus, the user may have more difficulty drawing conclusions which may require comparison of a group data. In other cases, a user may not benefit from insights which could be gleaned from simultaneous viewing of various, potentially unrelated, KPIs.

In other cases, a user may be provided with the ability to create KPI dashboards by 'dragging and dropping" variables onto the dash to create the KPI from scratch. However, this can be a time-intensive process, and also result in missed insights from grouped or related KPIs. There may also be limited access to the context in which the KPI is use of its usefulness, and thus further opportunity for insight may be missed.

In embodiments, a system may establish a catalogue of self-contained KPI objects which can allow users to select KPIs along with metadata associated with the KPI for display. The KPIs may be considered "intelligent" KPIs as they may be updated in real-time based on user feedback as well comprise relevant data associated with the KPIs, to provide context and a more robust understanding of the KPI data. A user may select the particular KPI object or objects to display on a dashboard or dashboard card. This can allow for a user to see desired data side by side, in order to gain desired or unexpected insight. The metadata associated with the KPI can include KPI usage such as history, user rating, associated KPIs used to derive insight, or other related metadata. This metadata may be generated and updated consistently, upon a user selection, or in another way. Each KPI, once developed, may be stored in the catalogue and may be available for selection and use. As a KPI is consumed, usage data may be captured (e.g., frequency, rating, etc.) providing insight to others on the usefulness of a given KPI. In some embodiments, a set of one or more related KPIs may be recommended to a user upon the selection of a particular KPI.

In embodiments, each KPI represented in the catalogue of intelligent KPIs may be displayed as a KPI object. The KPI object may be a self-contained object that has a predefined set of metrics and display properties including, for example, chart type, colors, fonts, values, rules and logic. A KPI object may include metadata describing the attributes of each KPI. These attributes could include characteristics such as description, purpose, chart type, chart properties, visual examples of the KPIs, source data, algorithms, rules, and others.

In embodiments, KPIs may also be added to a dashboard card. The creation, selection, and use of dashboard cards may allow the user to see a number of KPIs together in order to analyze and draw further insight from the data. The dashboard card may be maintained in a card catalogue with metadata that describes the intended insight to be drawn from the card. Similar to the KPI, the dashboard card can be selected by users from the catalogue and usage data for the particular dashboard card may be captured and stored (e.g. number of downloads, card rating, or others).

In embodiments, a request for a first KPI may be received by a system. The request could come from a user, or from an automated setting. For example, a user could enter a search request for a particular KPI. In another example, an automated setting within a program could request a predetermined set of one or more KPIs, based on, for example, a user profile, or another setting, upon the opening of a data analytics program.

In embodiments, the system could access KPI data associated with the first KPI from a local or remote data source. As described herein, the associated data could include the current and/or historical KPI data. The system could then generate a self-contained KPI object for the first KPI by accessing data from a set of one or more code libraries. The system could access both KPI template code as well as visualization code. This code may be accessed from a code library and used by the system, for example, a KPI engine in the system, to generate the self-contained KPI object for the first KPI. The system may also generate a set of metadata associated with the first KPI to be included in the KPI object. The metadata may be accessed from a KPI catalog. Like the code library and the data sources, the KPI catalog may be located locally or remote to the computer system. Using the accessed KPI metadata, the system may generate for display on the KPI dash, a set of metadata objects to be contained within the KPI object. In embodiments, one of the metadata objects may be rating object. The rating object may indicate (e.g., by a numerical or graphical display) a rating for the particular KPI. The rating may be based on a user's historical usage, the past usage and input by other users, or in some other way.

The system may then display the KPI object, along with its affiliated metadata objects, on the KPI dash. One or more of these KPI objects may be generated and displayed for a user. They may be displayed in a catalog in a list format, or scattered across a user interface in a manner selected by the user. In this way, the KPI objects may be useful for generating new insight.

Based on a user's experience, or as part of the experience, the system may receive a rating for a particular KPI (for example, the first KPI). Responsive to this receipt of this rating, the system may update a cumulative rating of the KPI, which may be stored in the KPI catalog. Based on this updated cumulative rating, the metadata object in the KPI object may be updated, to reflect the new rating. In embodiments, various other of the selectable objects may be updated, based on user input or feedback, in a similar manner. In some embodiments, responsive to a selection, additional data may be displayed. For example, a KPI titled "meeting monthly targets" may be selected, and the system may generate and display a bar chart showing a month-by-month breakdown of percentage of monthly targets met. The chart could include both historical data and predictive data. In this way, the user could gain a broader picture of the relevance, context, and potential impact of the "meeting monthly targets" KPI. In some embodiments, one or more graphical representations of the KPI or associated metadata may be contained within and displayed as part of the KPI object (e.g., without further user selection or interaction).

FIG. 1 depicts a block diagram of a system 100 for generating an intelligent KPI object, according to embodiments. The system 100 may be carried out on various processing circuits and may include the engines described herein, or more or fewer engines than those described.

In embodiments, a request or selection of one or more key performance indicators (KPIs) may be received at a browser 112. In embodiments, the browser may receive user requests via an Asynchronous JavaScript and XML (AJAX) technology, or in another way. In embodiments, a request for a particular KPI or set of KPIs may be requested automatically upon the opening of a program or initialization of a system.

Responsive to the request, the browser may communicate the request to a KPI engine 110 over a network 120. In some embodiments, the network 120 may be implemented by any number of any suitable communications media (e.g., wide area network (WAN), local area network (LAN), Internet, Intranet, etc.). Alternatively, the KPI engine 110, domain data sources 102, the KPI catalog 112, and code libraries 104 may be local to each other, and communicate via any appropriate local communication medium (e.g., local area network (LAN), hardwire, wireless link, Intranet, etc.). In some embodiments, the network 120 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers, hundreds or thousands of them or more, disposed within one or more data centers and configured to share resources over the network 120.

KPI engine 110 may access KPI data associated with the first KPI from a set of one or more domain data sources 102. The KPI engine 110 may access the data over the network 120 from a set of domain data sources 102 (including, for example, databases 102A, 102B, and 102C). The data may be stored remotely on other servers, on the cloud, locally, or in another, and it may be located in one or more locations.

The KPI engine 110 may also access data from one or more code libraries 104. As depicted in FIG. 1 the code libraries 104 may comprise a set of KPI templates 106 and visualization templates 108. The code library or libraries 104 may comprise further templates or code. The PKI engine 110 may access over the network, and select appropriate template code and visualization code which can be used to generate a KPI display 114 on the browser 112 and populated with the data retrieved from the one or more domain data sources 102. The system may further access KPI metadata associated with the first KPI from a KPI catalog 122. The KPI metadata can be used to further populate and provide context for the particular KPI. The KPI metadata, along with the KPI data accessed from the domain data source 102, using the code accessed from the code libraries 104, may be used to generate a self-contained KPI object. The self-contained KPI, as described further herein, may be displayed on the browser, as indicated at 114.

The displayed KPI object may then be selected, per 116, by a user, a subsystem, or for another purpose. The KPI engine 110 may then receive a rating, per 118, for the KPI object. The rating may be received from a user. Responsive to the rating, the KPI engine 110 may update a cumulative rating for the particular KPI in the KPI catalog 122. The cumulative rating in the KPI catalog may indicate a userefullness of the first KPI to the user. For example, the rating could be based on a single rating (for example, a numeric rating between 1-5 or a graphical rating between 1-5 stars), or it may be based on a series of ratings (including, for example, ratings of ease of use, intuitiveness of graphics, helpfulness of associated KPIs contained within the KPI, or other factors). The PKI engine 110 can then update the self-contained KPI object displayed on the browser with the new cumulative rating information. In addition, while the receipt and updating of rating metadata is described herein, other metadata may be displayed and updated according to feedback or revised data.

Figure 2:
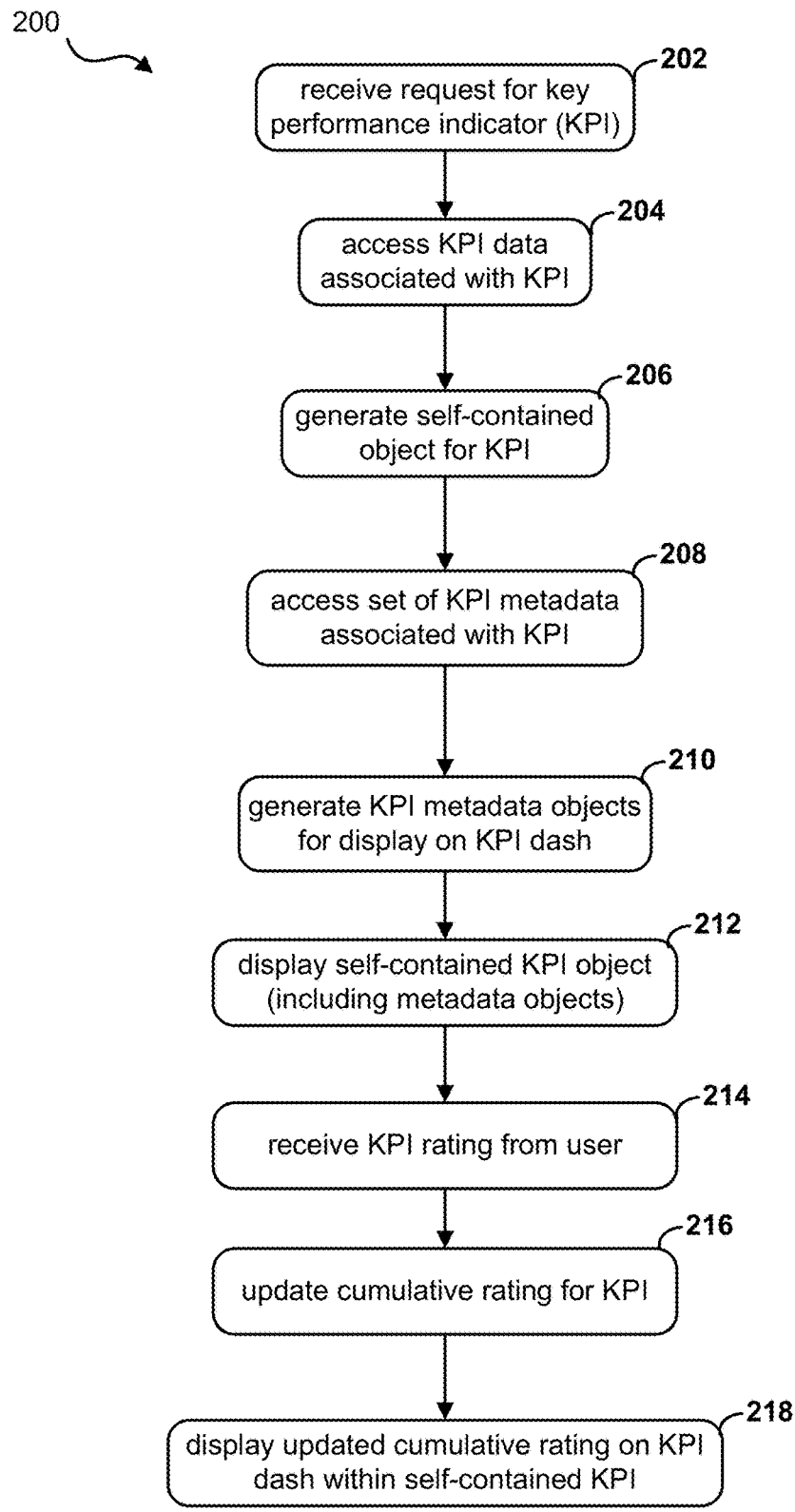
FIG. 2 depicts a flow diagram of a method for generating a self-contained KPI object, according to embodiments.

FIG. 2 depicts a flow diagram of a method 200 for generating a self-contained KPI object, according to embodiments. The method may be carried out on a system like system 100 of FIG. 1. The method may begin when the system receives a request for a key performance indicator, per 202. Responsive to the request, the system may access KPI data associated with the KPI, per 204. The system may generate a self-contained object for the KPI, per 206. For example, the self-contained KPI may be generated using source code accessed by the system and the KPI data from one or more domain data sources. The system could also access KPI metadata objects, for example, from a KPI catalog like KPI catalog 122 in FIG. 1. This metadata could be used to generate a set of one or more metadata objects which can be incorporated into the self-contained KPI object displayed on the dashboard, per 210. The system may then display the generated KPI object, along with its associated metadata objects, per 212. This display may be on a user interface of a computer, mobile device, or other device. The display may be a single entry on a dashboard containing several entries, the only entry on a dashboard, and/or modifiable in order to expand or shrink based on user preference or interaction.

The system may then receive a KPI rating from a user, per 214. For example, the user may indicate the KPI object, as displayed was particularly useful in gaining a particular insight or solving a particular problem. The user could also provide a simple numerical score or rating for the KPI. The system could update a cumulative rating for the KPI, per 216, based on the rating received from the user at 214. In embodiments, a set of one or more types of cumulative ratings for a particular KPI could be stored in a KPI catalog. The rating or ratings could be stored elsewhere, and could be divided and stored according to varying levels of complexity of the system, for example, a set of cumulative ratings could be maintained with each associated with a particular aspect of the KPI object's usefulness. In other embodiments, a single cumulative rating for the KPI object could be maintained, with each factor weighted equally or differentially, according to user settings and system design. In embodiments, the system could then update the KPI object by displaying the new cumulative rating at the rating object on the KPI dash, per 218.

Figure 3:
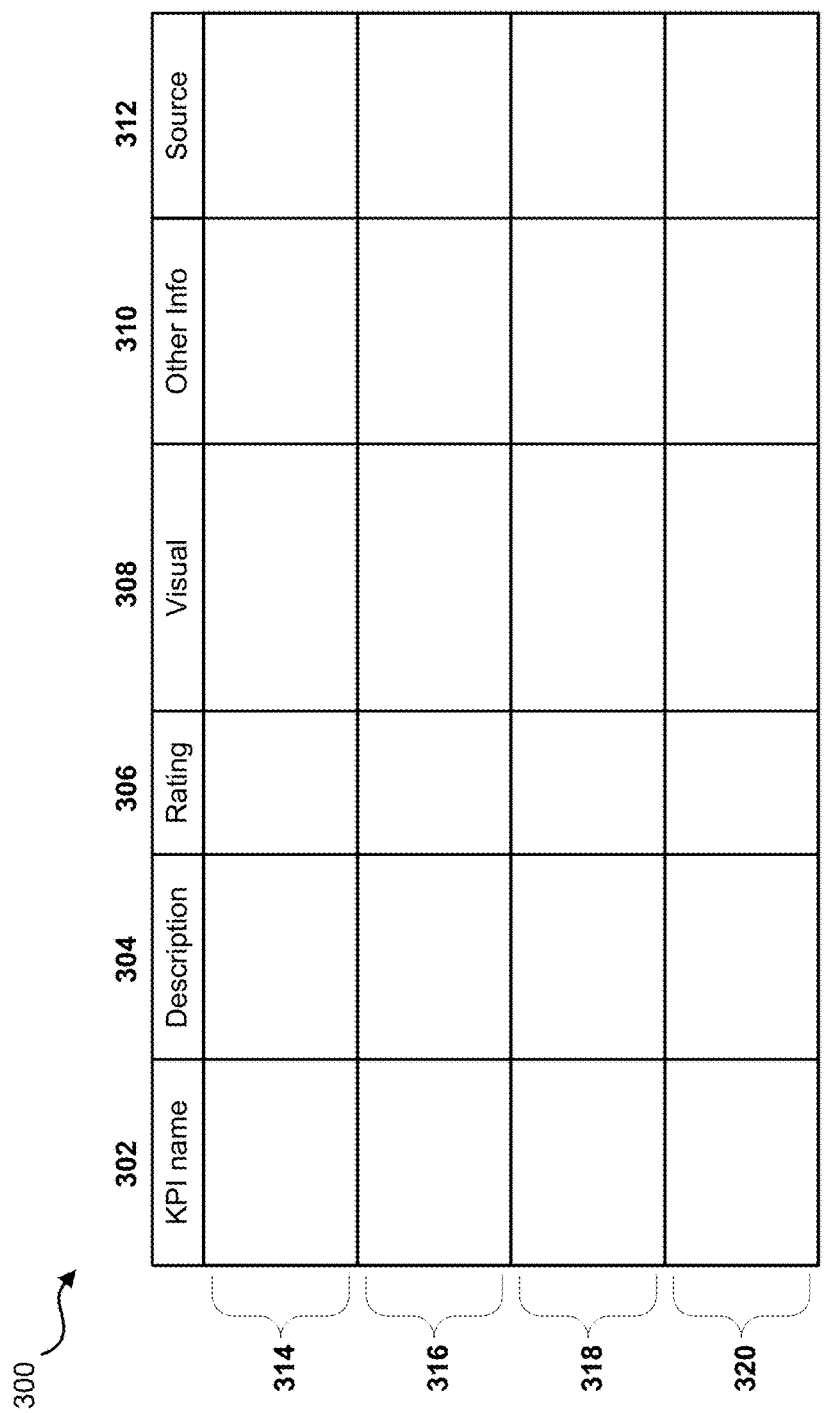
FIG. 3 depicts an example display of a catalog of self-contained KPI objects, according to embodiments.

FIG. 3 depicts an example display 300 of a catalog of self-contained KPI objects, according to embodiments. The display 300 may be a display that is generated as described in FIGS. 1 and 2. For example, the display 300 may comprise a set of self-contained updateable PKI object. The display 300 may be shown on a screen of a computer, personal device, or other monitor or suitable device. In embodiments, the display 300 may comprise a set of rows and columns. In some embodiments, each row, for example, rows 314, 316, 318, and 320 may each be a different, individual self-contained KPI object. The object may have been generated responsive to a request, as described herein. Each KPI object, for example, row 314, may comprise a series of data, which can be organized in cells, arranged in columns, as shown on display 300. The KPI data and its associated data may be arranged in other manners, too, as desired by a user or as determined suitable for the type of data.

In embodiments, the KPI name may be listed in the first column, column 302. For example, a KPI could be named "Average Sales Targets Met". The next cell may contain a description of the KPI, per 304. For example, the "Average Sales Targets Met" KPI may be described as "a numeric value showing an average of monthly targets that have been met or exceeded across x department". A KPI object may also contain a rating, per 306. As described herein, the rating may be a reflection of a set of one or more cumulative ratings. A next column, per 308, may contain one or more visuals of the KPI. In some instances, the entire KPI can be displayed as a visual. In others, a graph or chart may be used to assist in the visualization of the data. In others still, graphical representations of associated KPIs or charts of metadata related to the KPI may be displayed in the visual column 308. An additional "other info" column, per 310, may also be included as part of each KPI object. In embodiments, other data including usage history or other data. In embodiments, another column 312 might be generated for each KPI which includes a display of the source or sources of data for the KPI.

Figure 4:
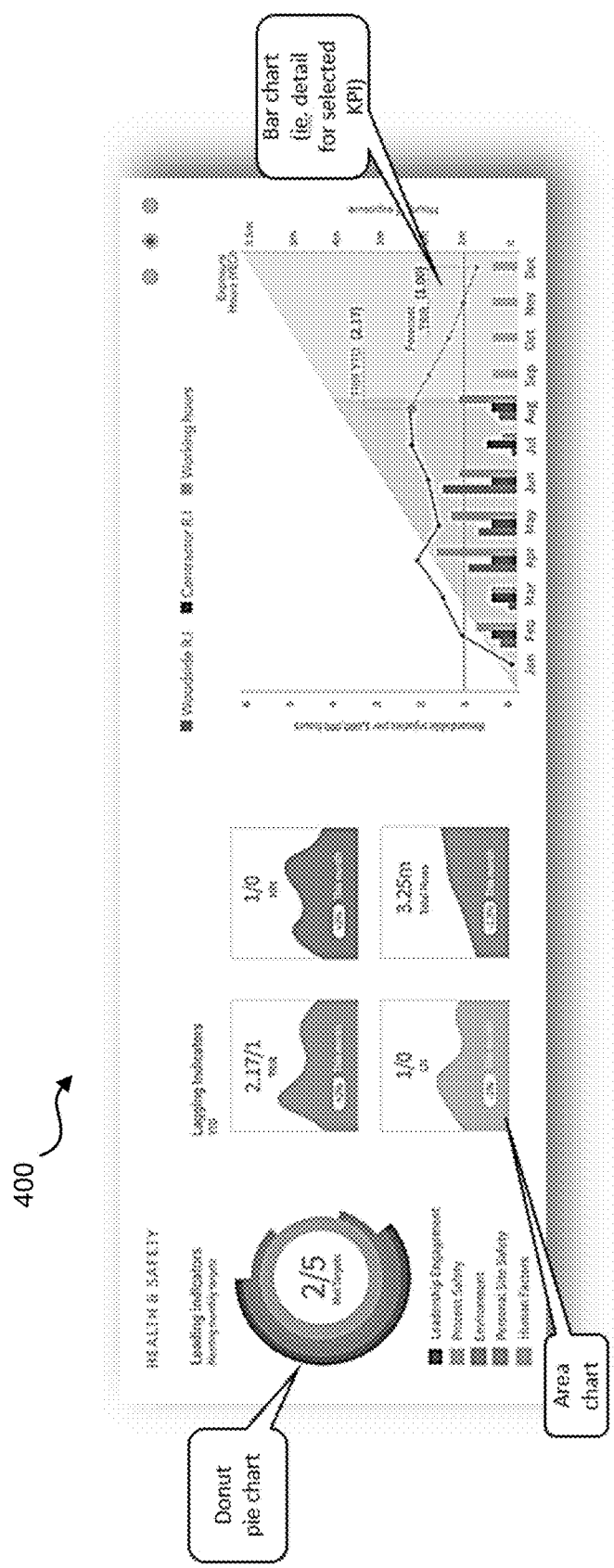
FIG. 4 depicts a set of example self-contained KPI objects, according to embodiments.

FIG. 4 depicts an example of a UI of a set of self-contained KPI objects, according to embodiments. In some embodiments, the KPI object or objects may be displayed to a user as shown in display 400. In embodiments, the display 400 may be a dashboard card. As described herein, the KPI objects on the dashboard card may be user-selected or preconfigured. Following its generation (for example, through a user selecting a set of KPI objects to appear on a single card), the dashboard card may be stored in the desired configuration (for example, in a card catalog), to be accessed later by a same or different user.

FIG. 5 depicts an example UI of a list of two self-contained KPI objects, according to embodiments. In some embodiments, the KPI objects may be displayed to a user as shown in display 500. Similarly, a dashboard could contain a list of two or more dashboard cards, where each card, for example, a card as shown in display 400 of FIG. 4, could contain its own set of KPI objects, as well as metadata associated with each object and card.

Figure 6:
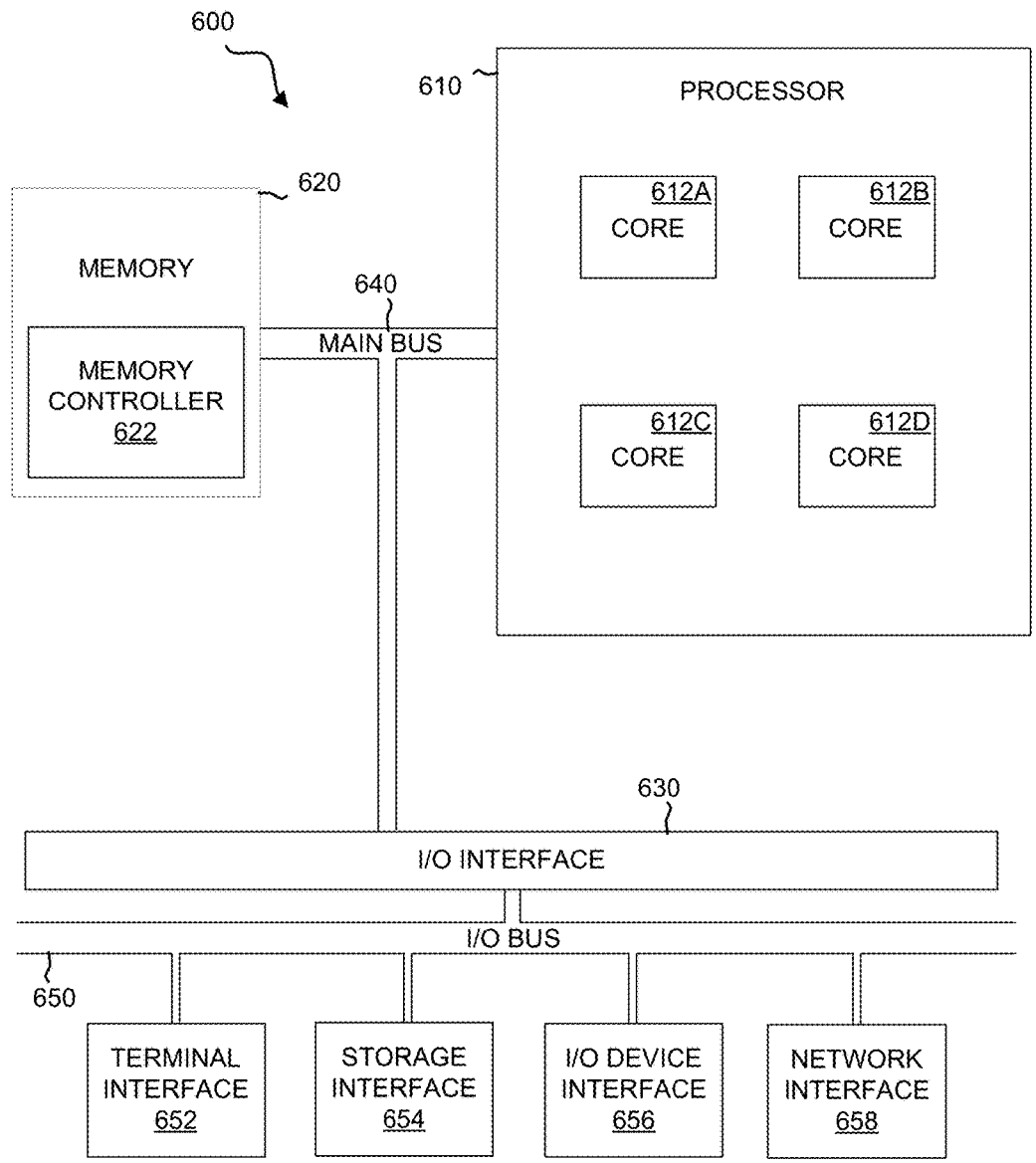
FIG. 6 depicts representative major components of an example computer system that may be used, according to embodiments.

FIG. 6 depicts the representative major components of an example computer system 600 that may be used, in accordance with embodiments of the present disclosure. It is appreciated that individual components may vary in complexity, number, type, and\or configuration. The particular examples disclosed are for example purposes only and are not necessarily the only such variations. The computer system 600 may comprise a processor 610, memory 620, an input/output interface (herein I/O or I/O interface) 630, and a main bus 640. The main bus 640 may provide communication pathways for the other components of the computer system 600. In some embodiments, the main bus 640 may connect to other components such as a specialized digital signal processor (not depicted).

The processor 610 of the computer system 600 may be comprised of one or more cores 612A, 612B, 612C, 612D (collectively 612). The processor 610 may additionally include one or more memory buffers or caches (not depicted) that provide temporary storage of instructions and data for the cores 612. The cores 612 may perform instructions on input provided from the caches or from the memory 620 and output the result to caches or the memory. The cores 612 may be comprised of one or more circuits configured to perform one or more methods consistent with embodiments of the present disclosure. In some embodiments, the computer system 600 may contain multiple processors 610. In some embodiments, the computer system 600 may be a single processor 610 with a singular core 612.

The memory 620 of the computer system 601 may include a memory controller 622. In some embodiments, the memory 620 may comprise a random-access semiconductor memory, storage device, or storage medium (either volatile or non-volatile) for storing data and programs. In some embodiments, the memory may be in the form of modules (e.g., dual in-line memory modules). The memory controller 622 may communicate with the processor 610, facilitating storage and retrieval of information in the memory 620. The memory controller 622 may communicate with the I/O interface 630, facilitating storage and retrieval of input or output in the memory 620.

The I/O interface 630 may comprise an I/O bus 650, a terminal interface 652, a storage interface 654, an I/O device interface 656, and a network interface 658. The I/O interface 630 may connect the main bus 640 to the I/O bus 650. The I/O interface 630 may direct instructions and data from the processor 610 and memory 620 to the various interfaces of the I/O bus 650. The I/O interface 630 may also direct instructions and data from the various interfaces of the I/O bus 650 to the processor 610 and memory 620. The various interfaces may include the terminal interface 652, the storage interface 654, the I/O device interface 656, and the network interface 658. In some embodiments, the various interfaces may include a subset of the aforementioned interfaces (e.g., an embedded computer system in an industrial application may not include the terminal interface 652 and the storage interface 654).

Logic modules throughout the computer system 600—including but not limited to the memory 620, the processor 610, and the I/O interface 630—may communicate failures and changes to one or more components to a hypervisor or operating system (not depicted). The hypervisor or the operating system may allocate the various resources available in the computer system 600 and track the location of data in memory 620 and of processes assigned to various cores 612. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
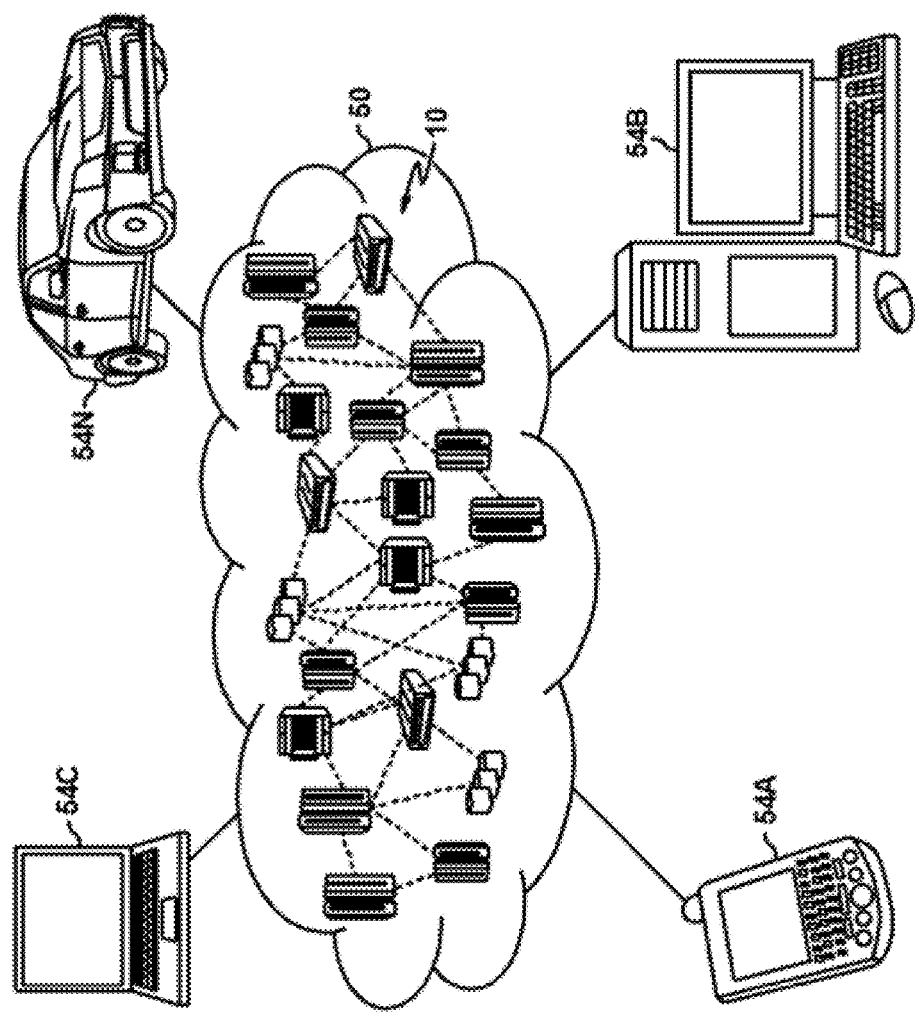
FIG. 7 depicts a cloud computing environment, according to embodiments.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
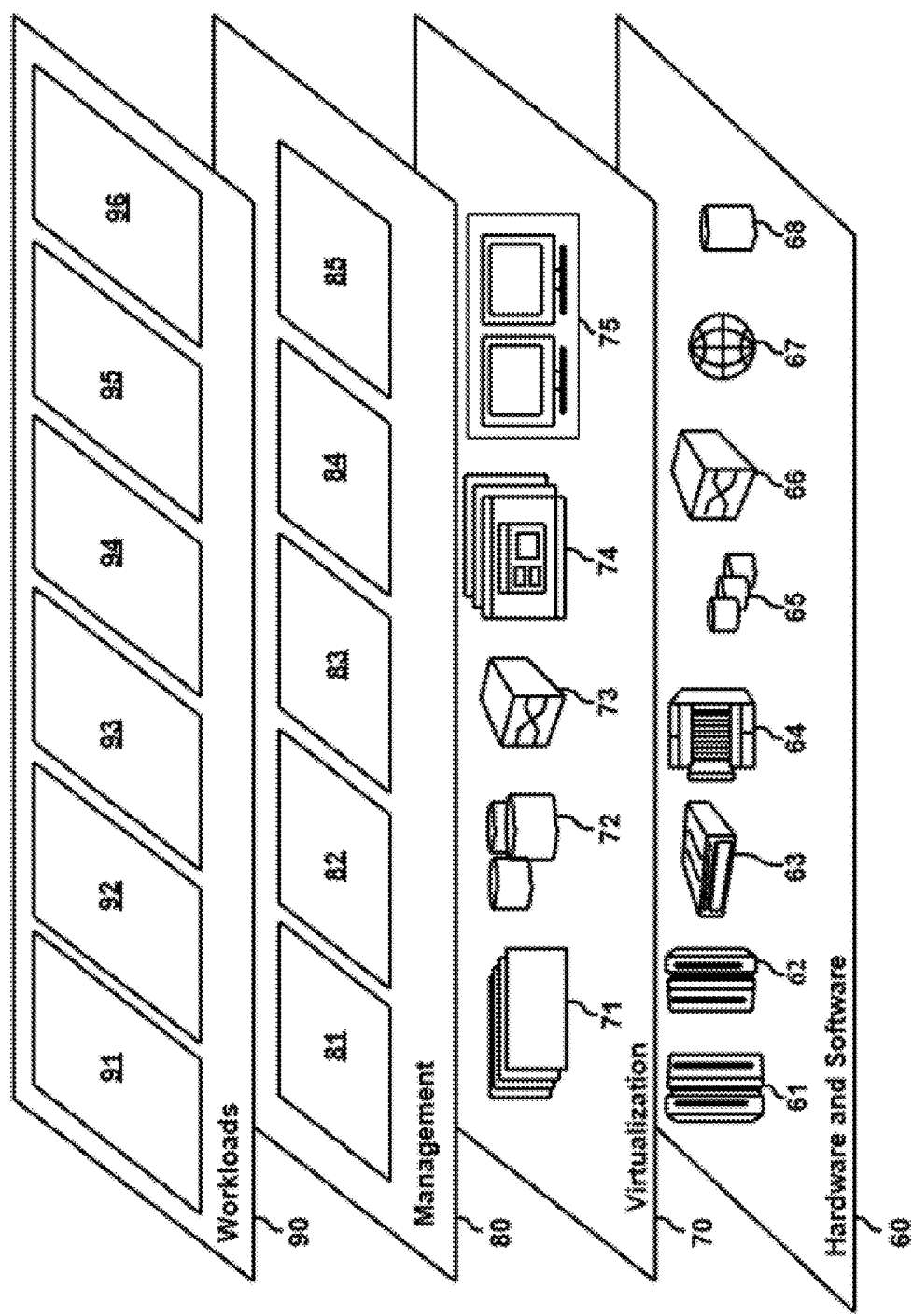
FIG. 8 depicts abstraction model layers, according to embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-contained KPI generating and updating 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:

receiving a request for a first key performance indicator (KPI), wherein the KPI is titled "meeting monthly targets" and comprises a bar chart reflecting month-by-month breakdowns of percentages of monthly targets met, and wherein the bar chart includes both historical data and predictive data, and wherein the request for the first KPI is received at a browser via an Asynchronous JavaScript and XML (AJAX) technology;

accessing, from a data source, KPI data associated with the first KPI;

generating a self-contained KPI object for the first KPI, by:

accessing, from a set of code libraries, KPI template code and visualization template code; and generating, using the KPI template code and the visualization template code, a self-contained KPI object for the first KPI;

accessing, from a KPI catalog, a set of KPI metadata associated with the first KPI;

generating, for display on a KPI dashboard and as part of the self-contained KPI object, a set of first KPI metadata objects, wherein the set of first KPI metadata objects comprises a rating object and wherein the KIP dashboard is displayed on a user interface and comprises a set of selectable objects, wherein the set of selectable objects are icons associated with additional metadata, and wherein upon selection of one of the selectable objects in the set of selectable objects, additional data associated with the icon is displayed to a user, and wherein the KPI dashboard comprises a set of dashboard cards, wherein each dashboard card comprises a set of self-contained KPI objects;

displaying, on the KPI dashboard, the self-contained KPI object for the first KPI, the self-contained KPI object comprising the set of first KPI metadata objects;

receiving, from a user, a rating for the first KPI;

updating, in the KPI catalog and responsive to the receiving the rating, a cumulative rating for the first KPI, wherein the cumulative rating indicates a usefulness of the first KPI to users;

displaying, on the KPI dashboard and within the self-contained KPI object for the first KPI, the updated cumulative rating for the first KPI;

receiving, from the user, a selection of a particular selectable object in the set of selectable objects, wherein the selection from the user comprises entry of data;

accessing, by the system and responsive to the selection, a database associated with the selectable object; and updating, based on the selection, the database associated with the selectable object.

\* \* \* \* \*